United States Patent [19]
Aiello et al.

[11] Patent Number: 5,727,063
[45] Date of Patent: Mar. 10, 1998

[54] PSEUDO-RANDOM GENERATOR

[75] Inventors: William Anthony Aiello, Madison; Ramarathnam Venkatesan, Morristown, both of N.J.

[73] Assignee: Bell Communications Research, Inc., Morristown, N.J.

[21] Appl. No.: 562,925

[22] Filed: Nov. 27, 1995

[51] Int. Cl.$^6$ .................................................. H04L 9/00
[52] U.S. Cl. ...................... 380/46; 364/717; 364/224.21
[58] Field of Search .......................... 380/46, 29, 49, 380/50; 364/717, 224.21

[56] References Cited

U.S. PATENT DOCUMENTS

| | | | |
|---|---|---|---|
| 4,238,854 | 12/1980 | Ehrsam et al. | 380/29 |
| 5,068,894 | 11/1991 | Hoppe | 380/23 |
| 5,297,207 | 3/1994 | Degele | 380/46 |
| 5,327,365 | 7/1994 | Fujisaki et al. | 364/717 |
| 5,365,466 | 11/1994 | Hazard | 364/717 |
| 5,412,587 | 5/1995 | Holt et al. | 364/717 |
| 5,420,928 | 5/1995 | Aiello et al. | 380/46 |
| 5,515,307 | 5/1996 | Aiello et al. | 364/717 |
| 5,541,996 | 7/1996 | Ridenour | 380/46 |
| 5,608,801 | 3/1997 | Aiello et al. | 380/46 |

OTHER PUBLICATIONS

Patent Cooperation Treaty Notification of Transmittal of International Preliminary Examination Report, PCT/US95/00716, 18 Jan. 1995.

Data Encryption Standard (DES), pub. National Bureau of Standards, Department of Commerce, FIPS, pub 46, Jan. 1977.

*Primary Examiner*—David C. Cain
*Attorney, Agent, or Firm*—James W. Falk; Loria B. Yeadon

[57] ABSTRACT

Methodology and concomitant circuitry to generate cryptographically strong pseudo-random bit streams utilize secure block cypher encoders. Each block cypher encoder has a random key and a first seed as an input, and the output of each encoder is fed back to connect to its input. The first seed serves as the initial input, and each subsequent input is the immediate output of the block cypher encoder. Each bit in the cryptographically strong pseudo-random bit stream is related to a first inner product between input to the block cypher encoder and a second seed and a second inner product between the random key and a third seed.

8 Claims, 4 Drawing Sheets

PSEUDO-RANDOM GENERATOR

RELATED PATENT AND APPLICATION

Reference is made to U.S. Pat. No. 5,420,928, entitled "Pseudo-Random Generator" which issued on May 30, 1994 for W. A. Aiello and R. Venkatesan, the applicants of the present application, and co-pending application Ser. No. 08/286,161, entitled "Pseudo-Random Generator" filed on Aug. 4, 1994, for W. A. Aiello, S. Rajagopalan, and R. Venkatesan wherein related inventions are disclosed and claimed and which are hereby incorporated by reference.

FIELD OF THE INVENTION

This invention relates generally to pseudo-random bit generators and, more specifically, to circuitry and concomitant methodology for generating cryptographically strong pseudo-random bits.

BACKGROUND OF THE INVENTION

A very large number of important processes and methods use an auxiliary input which is assumed to be truly random. Examples of such processes and methods include sorting, simulation and testing of complex systems, encryption, and many other cryptographic primitives. Producing a truly random auxiliary input of sufficient length is difficult. Typically, the auxiliary input is produced by a pseudo-random bit generator. Informally, a pseudo-random bit generator is any process or method which takes a short truly random string and produces a long "pseudo-random" string.

Many pseudo-random bit generators have been proposed and discussed in prior art literature, such as the popular linear congruentiai bit generator. In evaluating the utility of these bit generators, the conventional approach is to subject each bit generator to a standard regimen of empirical and analytical statistical tests to determine if the generators produce acceptable random bits. Those generators that pass the standard tests are often assumed to produce sufficiently good pseudo-random bit streams for the various purposes for which they are to be employed.

However, this assumption may be erroneous. For instance, it has been shown that the linear congruential bit generator is hardly general purpose since, after observing its outputs for a short period, it becomes possible to compute the future outputs correctly. It has also been shown how to predict the bits of the following generator: given a polynomial, output successive digits of the algebraic number defined by the polynomial. As another example, Monte Carlo simulations of a well-known physical system were recently shown to give results far from the known values when several well-known generators were used as input for the simulations.

While certain traditional generators may not be general purpose, they may be sufficient for certain purposes. For example, it has been shown that a few simple bit generators (including the linear congruential) are sufficient, in a rigorous sense, for a few specific applications. In short, them are examples where the traditional generators are known to be sufficient and there are examples where they are known to be insufficient. For all other cases there are no guarantees. Moreover, for complex methods and processes it is unlikely that the traditional generators will ever be proven to produce sufficiently random output.

Most recently, a different approach to pseudo-random bit generation has been developed based on the theory of "one-way" functions. For the immediate discussion, a one-way function is a function that is easy to compute but hard to invert for an overwhelming fraction of its range. With this notion in mind, a "cryptographically strong pseudo-random (CSPR) bit generator" is a generator that takes a short, truly random seed as input, then repeatly uses a one-way function to produce a long pseudorandom string of bits such that there is no feasible technique or procedure which can distinguish between the outputs of a CSPR bit generator and a truly random string of bits. It is also known that a CSPR bit generator will pass all statistical tests whose running times are small compared to the time required to invert the one-way function. In particular, using CSPR bits rather than truly random bits in test or other application environments whose running times are small with respect to the time to invert a one-way function will not impact on the results in any demonstrable way.

In addition to the many direct applications of CSPR bit generators mentioned previously, these bit generators may be used to compute cryptographically strong pseudo-random functions (CSPR functions). These functions take two parameters, namely, a function index and a function input. For a randomly chosen fixed index, an adversary with no knowledge of the index cannot choose a function input and then predict even a single bit of the resulting function value in a feasible amount of time. This is true even if the adversary has already seen many function values for many function inputs of its choosing.

CSPR functions have several applications. Two important applications are as follows. First, they can be used in a simple protocol for identifying party A to party B over a non-secure channel when A and B share a secret key. The shared key is used as a CSPR function index. B queries any party on the channel claiming to be A with a random function input. Only A will be able to return the correct function value.

Second, CSPR functions can be used to distribute independent random bits to each of the processes in a parallel or distributed computation. A single seed is first broadcast to each process. This shared seed is used as the CSPR function index. Using its process identification number as a function input, each process computes a CSPR function value as its random seed. Each process may now use this seed and a CSPR bit generator to compute CSPR bits for its own use.

In prior Patent '928, cryptographically strong pseudo-random bit generators and functions are implemented by circuitry and concomitant methodologies which utilize secure block cypher encoders to implement a cryptographically strong pseudo-random bit generator. Broadly, in accordance with our prior patent application, a stream of cryptographically strong pseudo-random bits is generated from first and second seeds, of the same length, and a block cypher encoder having a fixed random encoder key. The first seed serves as the first input to the block cypher encoder. Each subsequent input to the block cypher encoder is provided as the last output of the block cypher encoder. Each bit in the stream of cryptographically strong pseudo-random bits is determined in correspondence to an inner product between the input to the block cypher encoder and the second seed.

In accordance with another serial aspect of the present invention, a stream of cryptographically strong pseudo-random bits is generated from a first seed and a plurality S of second seeds, S being a non-zero positive integer, all seeds being of the same length, and a block cypher encoder having a fixed random encoder key. The first seed serves as the first input of the block cypher encoder. Each subsequent input to the block cypher encoder is provided as the last output of the block cypher encoder. S consecutive bits in the stream of cryptographically strong pseudo-random bits are determined in correspondence to S distinct inner products between the input to the block cypher encoder and the S second seeds.

SUMMARY OF THE INVENTION

In accordance with our present invention, we have found that an improved cryptographically strong pseudo-random bit generator can be realized by a method and circuitry wherein a third seed of the same length as the fixed random encoder key is employed, with the output bit being generated in correspondence with a first inner product between the input of the block cypher encoder and the second seed and a second inner product between the third seed and the fixed random encoder key.

The organization and operation of our present invention will be understood from a consideration of the detailed description of the illustrative embodiment, which follows, when taken in conjunction with the accompanying drawing.

DETAILED DESCRIPTION

By way of introducing terminology and notation useful in elucidating our present invention, an overview discussion and illustrative embodiments in accordance with the invention of our prior patent are described before the description of our present invention.

OVERVIEW

A "feasible" computation on inputs of length M takes time proportional to M, $M^2$, or $M^C$, where C is some fixed constant. "Infeasible" computations are those that are not feasible. A function F is "one-way" if it is feasible to compute but infeasible to invert for a random element in its range. A function is a one-way "permutation" if it is one-way and, in addition, length preserving and one-to-one, that is, if F(x) =y, then the lengths of x and y are equal and for every y there is exactly one x. Hereafter, F will denote a one-way permutation.

Two distributions $\mu_{1,2}$ on binary strings are "indistinguishable" if any feasible computation that guesses that a given string is generated under $\mu_1$ or $\mu_2$ succeeds with probability ½+ε(n) where ε(n) is negligible, that is, ε(n)=1/T(n) and T(n) is the running time of some infeasible computation. A "cryptographically strong pseudo-random distribution" is indistinguishable from the uniform distribution.

A cryptographically strong pseudo-random bit generator G accepts a random seed x of length X and outputs a longer bit string y of length $Y=X^{O(1)}$ and the output distribution is pseudo-random. This means that even a single bit of y cannot be predicted by looking at other bits of y.

Whereas the most recent realizations disclosed in the prior art to configure cryptographically-strong pseudo-random bit generators utilize one-way functions, the subject matter in accordance with the present invention is based on a block cypher encoder; such an encoder may be realized via the Data Encryption Standard (DES), as published by the National Bureau of Standards, Department of Commerce, FIPS, pub 46, Jan., 1977. DES has a reasonably fast implementation and is commercially available; for example, device type VM009 available from the VLI Technology Inc. of Tempe, Ariz. implements DES. A block cypher encoder takes as input a random key k and an input string x of size X to produce an output string of size X. For a fixed key k, the output y of a block cypher encoder, denoted F(k,x), is a permutation. In addition, the present invention makes more efficient use of the input seeds than the realizations in the prior art.

EMBODIMENTS OF OUR PRIOR INVENTION

Figure 1:
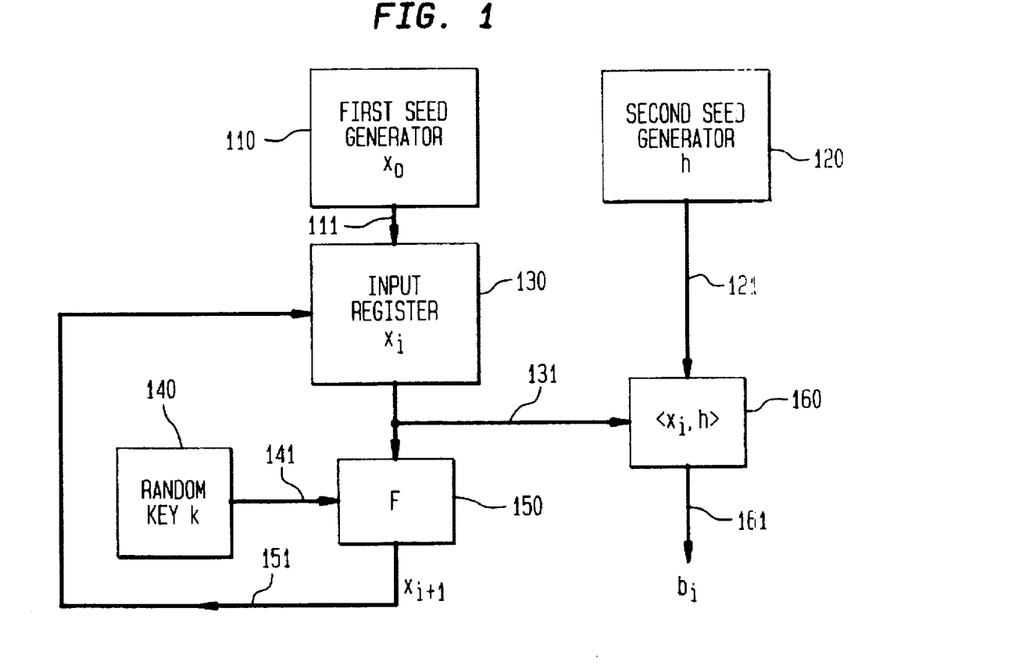
FIG. 1 is a block diagram of serial, cryptographically strong random bit generator in accordance with a prior invention.

As alluded to in the Overview, the generators of both our prior and the present invention are made practical by basing them on "block cypher" encoders. One manner in which a block cypher encoder is used as a fundamental component to construct a cryptographically strong pseudo-random bit generator is set forth with reference to FIG. 1. In FIG. 1, a serial block cypher encoder is depicted by element 150; the permutation effected by block cypher encoder 150 is denoted F. A fixed random key k, provided by random key generator 140, serves as one input to block cypher encoder 150 via bus 141. The other input to block cypher encoder is provided via bus 131 from an input register 130, which is shown as providing a set of bits denoted $x_i$ on output bus 131. Input register 130 has two inputs, namely, the first seed $x_0$ as provided by first seed generator 110 over bus 111, and the output of block encoder 150, denoted $x_{i+1}$, as provided by feedback bus 151. Input register 130 operates so that $x_i$ is first assigned the value $x_0$, whereas any of the subsequent value of $x_i$ is provided by overwriting the last value of $x_i$ with the updated value $x_{i+1}$. The input $x_i$ to encoder 150 also serves as one input to inner product device 160, also via bus 131. In addition, inner product device 160 has as an input, via bus 121, the second seed h produced by second seed generator 120. In general, the length of the first and second seeds are the same. The length of the random key does not need to be the same length as the first and second seeds; the size of the random key usually depends on how the block cypher works. Inner product device 160 determines an inner product, represented by $<x_i,h>\equiv b_i$, as follows: (a) compute the bitwise AND of $x_i$ with h; and (b) output as the inner product result the parity of all bits from the bitwise ANDing, that is, output a 0 if there are an even number of one bits, and a 1 if there are an odd number of one bits. Each $b_1$ bit is sequentially provided on output lead 161.

Figure 2:
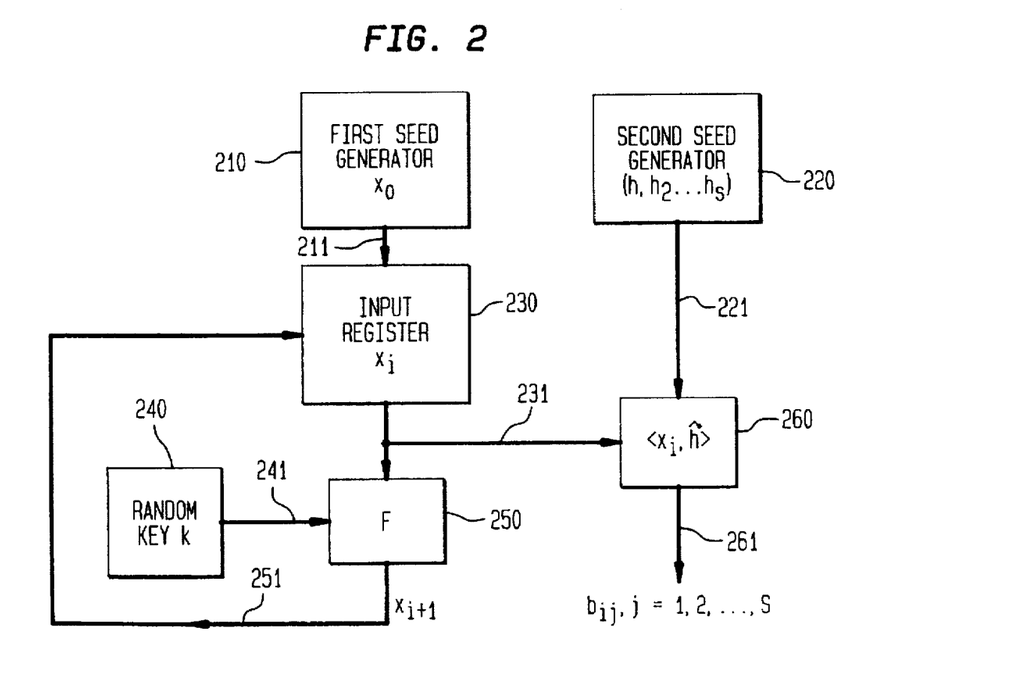
FIG. 2 is a block diagram of another serial, cryptographically strong random bit generator in accordance with a prior invention.

Another embodiment in which a block cypher encoder is used as a fundamental component to construct a cryptographically strong pseudo-random bit generator is set forth with reference to FIG. 2. In FIG. 2, a serial block cypher encoder is depicted by element 250; the permutation effected by block cypher 250 is denoted F. A fixed random key k, provided by random key generator 240, serves as one input to block cypher encoder 250 via bus 241. The other input to block cypher encoder is provided via a bus 231 from an input register 230, which is shown as providing a set of bits denoted xi on output bus 231. Input register 230 has two inputs, namely, the first seed $x_0$ as provided by first seed generator 210 over bus 211, and the output of block encoder 250, denoted $x_{i+1}$, as provided by feedback bus 251. Input register 230 operates so that $x_i$ is first assigned the value $x_0$, whereas any the subsequent value of $x_i$ is provided by overwriting the last value of $x_i$ with the updated value $x_{i+1}$. The input $x_i$ to encoder 250 also serves as one input to inner product device 260, also via bus 231. In addition, inner product device 260 has as inputs, via bus 221, the S second seeds $h_1, h_2, \ldots, h_s$ produced by second seed generator 220. In general, the length of the first seed, the S seeds, and the random key are all the same. Inner product device 260 determines, during the $i^{th}$ cycle, a set of S inner products, the set being represented by $\{<x_i,h_1>, <x_i,h_2>, \ldots, <x_i,h_s>\}$ (or as $<x_i,h>$ in compact notation), as follows: (a) compute the bitwise AND of $x_i$ with $h_j$, j=1, 2, ..., S; and (b) output as the $j^{th}$ inner product result the parity of all bits from the bitwise ANDing, that is, output a 0 if there are an even number of one bits, and a 1 if there are an odd number of one bits. The result of the $j^{th}$ inner product is a bit, denoted $b_j$, which is the $j^{th}$ bit in the set of S consecutive bits that compose the stream of cryptographically strong pseudo-random bits that appear on output bus 261 of inner product device 260. Another way to represent the output on bus 261 for the $i^{th}$ cycle is $b_{ij}$, j=1, 2 ..... S, as depicted in FIG. 2.

Figure 3:
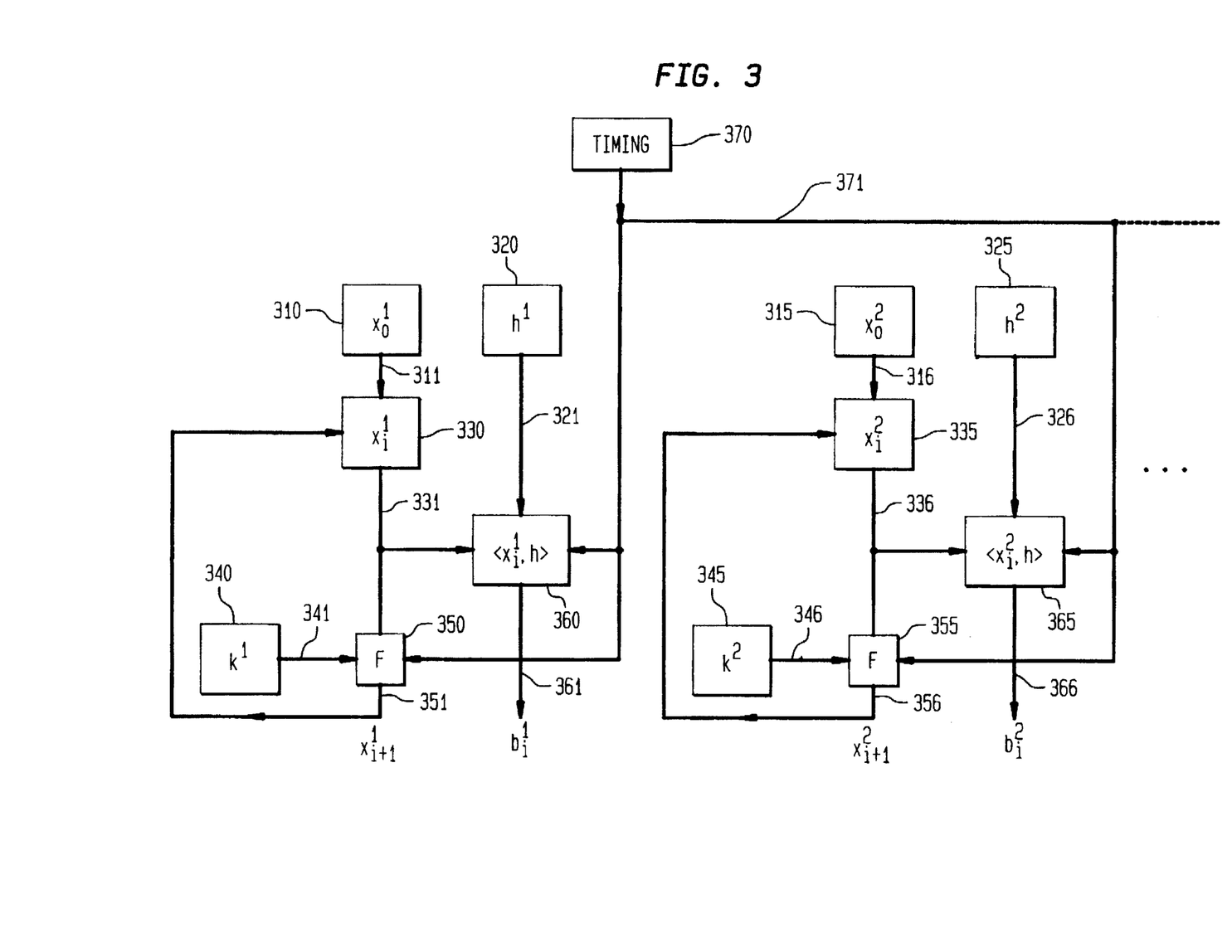
FIG. 3 is a block diagram of a parallel, cryptographically strong random bit generator in accordance with a prior invention.

Yet another manner in which block cypher encoders are used as fundamental components to construct a cryptographically strong pseudo-random bit generator is set forth with reference to FIG. 3. In FIG. 3, one block cypher encoder in an arrangement of parallel block cypher encoders 350, 355, . . . is depicted by element 350; the permutation effected by each block cypher encoder is denoted F. Elements 310, 320, 330, 340, 350, and 360 in FIG. 3 operate in the same manner as described with respect to elements 110, 120, 130, 140, 150, and 160 in FIG. 1. Similarly, elements 315, 325, 335, 345, 355, and 365 in FIG. 3 operate in the same manner as described with respect to elements 110, 120, 130, 140, 150, and 160 in FIG. 1; and so forth for the remaining encoders (not shown).

In particular, fixed random key $k_1$, provided by random key generator 340, serves as one input to block cypher encoder 350 via bus 341. The other input to block cypher encoder is provided via bus 331 from an input register 330, which is shown as providing a set of bits denoted $x_i^1$ on output bus 331. Input register 330 has two inputs, namely, the first seed $x_0^1$ as provided by first seed generator 310 over bus 311, and the output of block encoder 350, denoted $x^1_{i+1}$, as provided by feedback bus 351. Input register 330 operates so that $x_i^1$ is first assigned the value $x_0^1$, whereas any the subsequent value of $x_i^1$ is provided by overwriting the last value of $x_i^1$ with the updated value $x_{i+1}^1$. The input $x_i^1$ to encoder 350 also serves as one input to inner product device 360, also via bus 331. In addition, inner product device 360 has as an input, via bus 321, the second seed $h^1$ produced by second seed generator 320. In general, the length of the first $x_0^1$ and second $h^1$ seeds and the random key $k^1$ are the same. Inner product device 360 determines an inner product, represented by $<x_i^1,h>\equiv b_i^1$, as follows: (a) compute the bitwise AND of $s_i^1$ with $h^1$ and (b) output as the inner product result the parity of all bits from the bitwise ANDing, that is, output a 0 if there are an even number of one bits, and a 1 if there are an odd number of one bits. Each $b_i^1$ bit is provided on output lead 361.

In addition, fixed random key $k_2$, provided by random key generator 345, serves as one input to block cypher encoder 355 via bus 346. The other input to block cypher encoder is provided via bus 336 from an input register 335, which is shown as providing a set of bits denoted $x_i^2$ on output bus 336. Input register 335 has two inputs, namely, the first seed $x_0^2$ as provided by first seed generator 315 over bus 316, and the output of block encoder 355, denoted $x_{i+1}^2$, as provided by feedback bus 356. Input register 335 operates so that $x_i^2$ is first assigned the value $x_0^2$, whereas any the subsequent value of $x_i^2$ is provided by overwriting the last value of $x_i^2$ with the updated value $x_{i+1}^2$. The input $x_i^2$ to encoder 355 also serves as one input to inner product device 365, also via bus 335. In addition, inner product device 365 has as an input, via bus 326, the second seed $h^2$ produced by second seed generator 325. In general, the length of the first $x_0^1$ and second $h^2$ seeds and the random key $k^2$ are the same. Inner product device 365 determines an inner product, represented by $<x_i^2, h>\equiv b^2_i$, as follows: (a) compute the bitwise AND of $s_i^2$ with $h^1$ and (b) output as the inner product result the parity of all bits from the bitwise ANDing, that is, output a 0 if there are an even number of one bits, and a 1 if there are an odd number of one bits. Each $b_i^2$ bit is provided on output lead 361.

Finally, to control the production of the parallel bits $b_i^1, b_i^2$ . . . during the $i^{th}$ cycle, timing device 370 is coupled to each block cypher encoder 330, 335, . . . and each inner product device 360, 365 . . . . to output the parallel bits during a desired cycle time interval.

Figure 4:
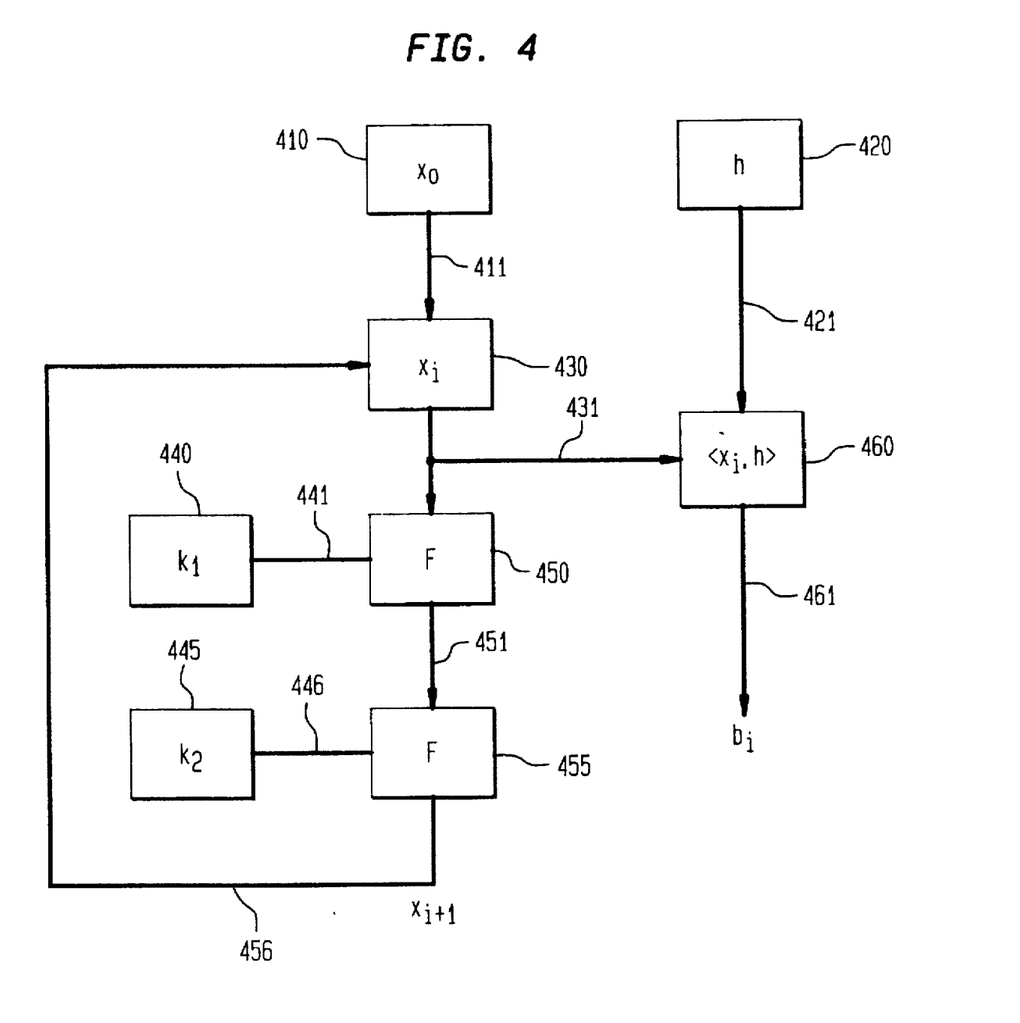
FIG. 4 iS a block diagram of a serial, secure, cryptographically strong random bit generator in accordance with a prior invention.

All of the above implementations have considered feeding back the output of a given block cypher encoder to its input to provide what is, in effect, a sequence of random seeds for processing. To provide an added measure of security, the implementation of FIG. 4 is employed. In particular, with reference to FIG. 4, two block cypher encoders 450 and 455 are used as fundamental components to construct a cryptographically strong pseudorandom bit generator. In FIG. 4, a first block cypher encoder is depicted by element 450 and a second block cypher encoder is depicted by element 455; the permutation effected by each block cypher encoder is denoted F. The output of block cypher encoder 450 is connected to the input of block cypher encoder via bus 451. A first fixed random key $k_1$, provided by random key generator 440, serves as one input to block cypher encoder 450 via bus 441. A second fixed random key $k_2$, provided by random key generator 445, serves as one input to block cypher encoder 455 via bus 446. The other input to block cypher encoder is provided via bus 431 from an input register 430, which is shown as providing a set of bits denoted x i on output bus 431. Input register 430 has two inputs, namely, the first seed $x_0$ as provided by first seed generator 410 over bus 411, and the output of block encoder 455, denoted $x_{i+1}$, as provided by feedback bus 456. Input register 430 operates so that $x_i$ is first assigned the value $x_0$, whereas any subsequent value of $x_i$ is provided by overwriting the last value of $x_i$ with the updated value $x_{i+1}$. The input $x_i$ to encoder 450 also serves as one input to inner product device 460, also via bus 431. In addition, inner product device 460 has as an input, via bus 421, the second seed h produced by second seed generator 420. In general, the length of the first and second seeds and the random keys $k_1$ and $k_2$ are the same. Inner product device 460 determines an inner product, represented by $<x_i,h>\equiv b_i$, as follows: (a) compute the bitwise AND of $x_i$ with h; and (b) output as the inner product result the parity of all bits from the bitwise ANDing, that is, output a 0 if there are an even number of one bits, and a 1 if there are an odd number of one bits. Each $b_i$ bit is sequentially provided on output lead 461.

EMBODIMENT OF OUR PRESENT INVENTION

Figure 5:
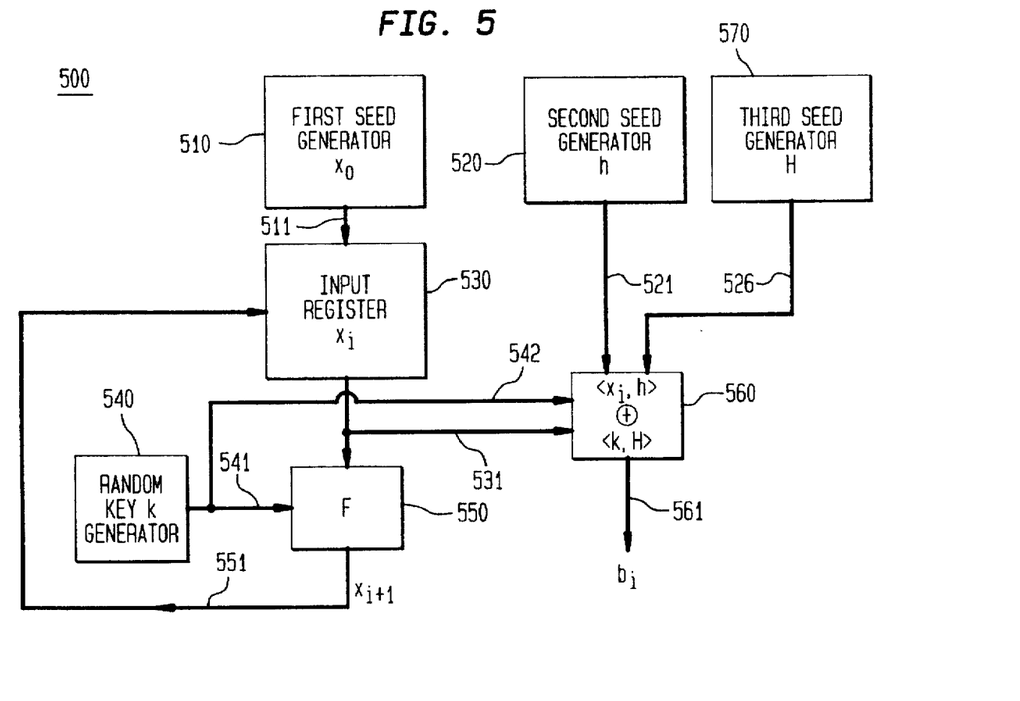
FIG. 5 is a block diagram of an illustrative embodiment of a serial cryptographically strong random bit generator in accordance with an aspect of our present invention.

An illustrative embodiment of our present invention, in which a block cypher encoder is used as a fundamental component to construct a cryptographically strong pseudo-random bit generator 500, is set forth in FIG. 5. Similar to the bit generator of FIG. 1, the bit generator 500 of FIG. 5 includes a first seed generator 510, which outputs a first seed, $x_0$, and a second seed generator 520, which outputs a second seed, h. Bit generator 500 also includes a serial block cypher encoder 550, which effects the permutation, F, and outputs $x_{i+1}$, and a random key generator 540, which generates a fixed random key, k. Bit generator 500 further includes an input register 530 which receives as inputs the first seed, $x_0$, over bus 511 from the first seed generator 510 and the output from the block cypher encoder 550, $x_{i+1}$ via feedback bus 551, and which outputs a set of bits, $x_i$. As in FIG. 1, input register 530 assigns $x_i$ the value of $x_0$, and assigns any subsequent value of $x_i$ by overwriting the last value of $x_i$ with the updated value of $x_{i+1}$. The bit generator 500 also includes an inner product device 560 which receives as inputs $x_i$ via bus 531 from input register 530, and h from the second seed generator 520 via bus 521.

Figure 6:
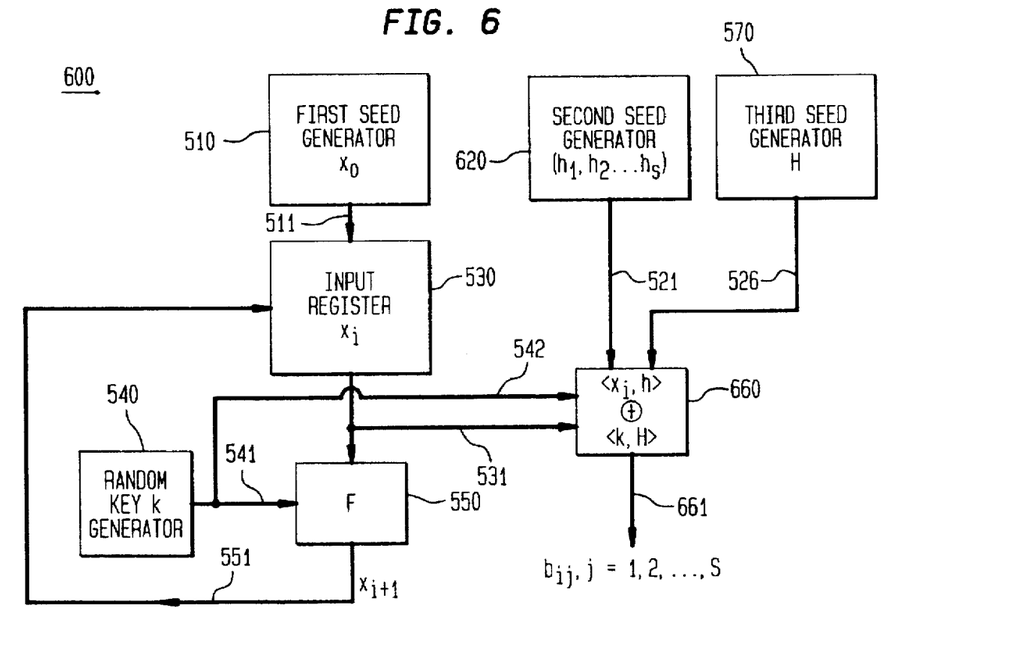
FIG. 6 is a block diagram of another illustrative embodiment of a serial cryptographically strong random bit generator in accordance with an aspect of our present invention.

Distinct from the bit generator of FIG. 1, bit generator 500 includes a third seed generator 570 which outputs a third seed H over bus 526 as an input to the inner product device 560. Also distinct from the bit generator of FIG. 1, the inner product device 560 receives as an input random key, k, from random key generator 540 via bus 542. The length of the third seed, H, is the same as the length of random key, k. The inner product device 560 computes an output, $b_i$, which is a cryptographically stronger pseudo-random bit and wherein $<x_i,h>+<k, H>=b_i$, by computing a first inner product of $x_i$ and h ($<x_i,h>$) and a second inner product of k and H ($<k, H>$), then XORing the first and second inner products and outputting, as the XORed result, the parity of all bits from the bitwise XORing of the first and second inner products. These distinctions can be employed in any of the aforementioned illustrative embodiments to produce an pseudo-random bit that is cryptographically even stronger. As shown in FIG. 6, these distinctions are employed in combination with a second seed generator 620 which generates S second seeds ($h_1, h_2, \ldots h_s$), as similarly shown in, and described above in connection with, FIG. 2. In this embodiment, the inner product device 660 outputs via bus 661 pseudo-random, bits $b_{ij}$, wherein $b_{ij}=<x_i,h_j>+<k, H>$, for j=1, 2, ... , S.

CONCLUSION

It is to be understood that the above-described embodiment is simply illustrative of the principles in accordance with the present invention. Other embodiments may be readily devised by those skilled in the art which may embody the principles in spirit and scope. Thus, it is to be further understood that the circuit arrangement described herein is not limited to the specific forms shown by way of illustration but may assume other embodiments limited only by the scope of the appended claims.

What is claimed is:

1. A method for generating a stream of cryptographically strong pseudo random bits with a block cypher encoder having a fixed random encoder key, first and second seeds of the same length, and a third seed of the same length as the fixed random encoder key, the method comprising the steps of (a) inputting the first seed as the first input to the block cypher encoder, (b) generating an output bit in the stream in correspondence with a first inner product between the input of the block cypher encoder and the second seed, and a second inner product between the third seed and the fixed random encoder key; and (c) feeding back the output of the block cypher encoder as the next input to the block cypher encoder, and returning to step (b).

2. The method as recited in claim 1 wherein said step of generating said output bit includes the steps of bitwise XORing said first and second inner products and outputting the parity of said bitwise XORing step as said output bit.

3. Circuitry for generating a stream of cryptographically strong pseudo-random bits utilizing first and second seeds of the same length, and a third seed, the circuitry comprising a block cypher encoder having a fixed random encoder key of the same length as the third seed, means, coupled to the input to said block cypher encoder, for inputting the first seed as the first input to said block cypher encoder, means, coupled to the input of said block cypher encoder, for generating an output bit in the stream in correspondence with a first inner product between the input of said block cypher encoder and the second seed, and a second inner product between the third seed and said fixed random encoder key, and means, coupled to the input and output of said block cypher encoder, for feeding back the output of said block cypher encoder to the input of the block cypher encoder.

4. The circuitry as recited in claim 3 wherein means for generating said output bit includes means, coupled to the input of said block cypher encoder, for bitwise XORing the said first and second inner products and means, coupled to said means for bitwise XORing, for determining the parity of the output of said means for bitwise XORing and for outputting said parity as said output bit.

5. Circuitry for generating a stream of cryptographically strong pseudo-random bits utilizing a first seed, S second seeds, and a third seed, the cimuitry comprising a block cypher encoder having a fixed random encoder key of the same length as the third seed, means, coupled to the input of said block cypher encoder, for inputting the first seed as the first input to said block cypher encoder, means, coupled to the input of said block cypher encoder, for generating S output bits in the stream in correspondence with S first inner products between the input of said block cypher encoder and each of the S second seeds, and a second inner product between the third seed and said fixed random encoder key.

means, coupled to the input and output of said block cypher encoder, for feeding back the output of said block cypher encoder to the input of said block cypher encoder.

6. The cimuitry as recited in claim 5 wherein said means for generating said S output bits includes means, coupled to the input of said block cypher encoder, for bitwise XORing each of said S first inner products and said second inner product, and means, coupled to said means for bitwise XORing, for determining the parity of the output of said means for bitwise XORing and for outputting said parity.

7. A method for generating a stream of cryptographically strong pseudorandom bits with a block cypher encoder having a fixed random encoder key, a first seed and S second seeds of the same length, and a third seed, the method comprising the steps of (a) inputting the first seed as the first input to the block cypher encoder, (b) generating S output bits in the stream in correspondence with S first inner products between the input of the block cypher encoder and each of the S second seeds, and a second inner product between the third seed and the fixed random encoder key, and (c) feeding back the output of the block cypher encoder as the next input to the block cypher encoder, and returning to step (b).

8. The method as recited in claim 7 wherein said step of generating said S output bits includes the steps of bitwise XORing each of said S first inner products and said second inner product, and outputting the parity of said bitwise XORing step as the corresponding one of said S output bits.

* * * * *

UNITED STATES PATENT AND TRADEMARK OFFICE
CERTIFICATE OF CORRECTION

| | |
|---|---|
| PATENT NO. | : 5,727,063 |
| DATED | : March 10, 1998 |
| INVENTOR(S) | : Aiello et al. |

It is certified that error appears in the above-identified patent and that said Letters Patent is hereby corrected as shown below:

Column 8,
Line 46, after "seeds," insert -- S being a non-zero positive integer, --.

Column 9,
Line 7, after "length," insert -- S being a non-zero positive integer --.

Signed and Sealed this

Eleventh Day of December, 2001

Attest:

NICHOLAS P. GODICI
Attesting Officer   Acting Director of the United States Patent and Trademark Office

UNITED STATES PATENT AND TRADEMARK OFFICE
CERTIFICATE OF CORRECTION

PATENT NO. : 5,727,063
DATED : March 10, 1998
INVENTOR(S) : Aiello et al.

It is certified that error appears in the above-identified patent and that said Letters Patent is hereby corrected as shown below:

Column 8,
Line 46, after "seeds," insert -- S being a non-zero positive integer, --.

Column 9,
Line 7, after "length," insert -- S being a non-zero positive integer --.

Signed and Sealed this

Eighteenth Day of December, 2001

Attest:

JAMES E. ROGAN
Attesting Officer      Director of the United States Patent and Trademark Office